United States Patent [19]

Bevan

[11] Patent Number: 4,999,150
[45] Date of Patent: Mar. 12, 1991

[54] APPARATUS AND METHOD FOR INTRODUCING REINFORCEMENT INTO A MOLD

[75] Inventor: Christopher G. Bevan, Stamford, England

[73] Assignee: C. G. Bevan Associates Limited, Corby, England

[21] Appl. No.: 184,423

[22] Filed: Apr. 21, 1988

[30] Foreign Application Priority Data

Apr. 21, 1987 [GB] United Kingdom ................ 8709324

[51] Int. Cl.<sup>5</sup> ...................... B29C 67/14; B29C 51/08
[52] U.S. Cl. .................................... 264/257; 264/108; 425/111; 425/112; 425/117; 425/125; 425/127; 425/397; 425/398
[58] Field of Search ............... 425/112, 110, 114, 117, 425/120, 122, 123, 125, 126.2, 111, 127, 397, 398; 264/258, 257, 103, 108

[56] References Cited

U.S. PATENT DOCUMENTS

| 3,431,158 | 3/1969 | Poulsen | 425/112 |
|---|---|---|---|
| 3,520,750 | 7/1970 | Li | 425/112 |
| 3,555,614 | 1/1971 | Wiltshire | 425/112 |
| 3,746,589 | 7/1973 | Reinke | 264/258 |
| 3,868,893 | 3/1975 | Sutch | 425/112 |
| 4,098,562 | 7/1978 | Levin | 425/121 |
| 4,216,184 | 8/1980 | Thomas | 264/257 |
| 4,256,680 | 3/1981 | Usui | 264/257 |

FOREIGN PATENT DOCUMENTS

| 2717623 | 10/1978 | Fed. Rep. of Germany . |
|---|---|---|
| 1361748 | 6/1963 | France . |
| 7004589 | 10/1971 | Netherlands . |
| 540210 | 10/1941 | United Kingdom . |
| 601853 | 5/1948 | United Kingdom . |
| 654925 | 7/1951 | United Kingdom . |
| 803950 | 11/1958 | United Kingdom . |
| 1346767 | 2/1974 | United Kingdom . |
| 1382069 | 1/1975 | United Kingdom . |
| 2067125 | 6/1981 | United Kingdom . |
| 2183200 | 6/1987 | United Kingdom . |

Primary Examiner—Jay H. Woo
Assistant Examiner—Jeremiah F. Durkin, III
Attorney, Agent, or Firm—Fisher, Christen & Sabol

[57] ABSTRACT

A method and a device for introducing reinforcing strands into a vertical mold through the open upper end thereof. An array of strand material is positioned to extend across the open end of a mold and an insertion device is lowered into the mold. The insertion device engages the strand material during its downward motion and draws an appropriate amount of such material from a continuous supply thereof to give a strand reinforcement of elongate U-shape within the mold. A reciprocable carriage is provided whereby the leading end of the strand is presented to a clamp at a remote side of the mold opening, the carriage having a selectively operable clamp thereon for engagement with the strand during movement of the carriage toward the clamp.

17 Claims, 4 Drawing Sheets

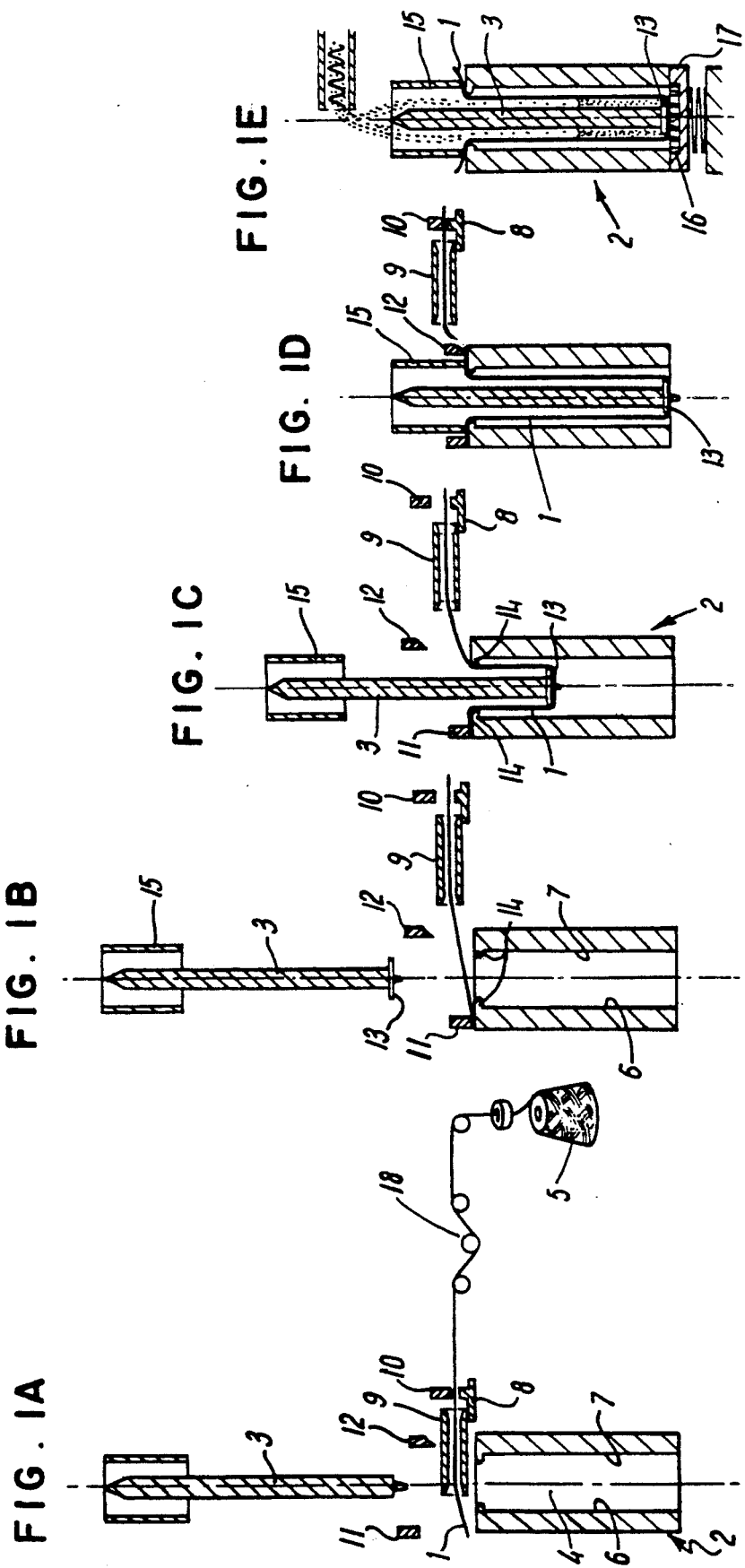

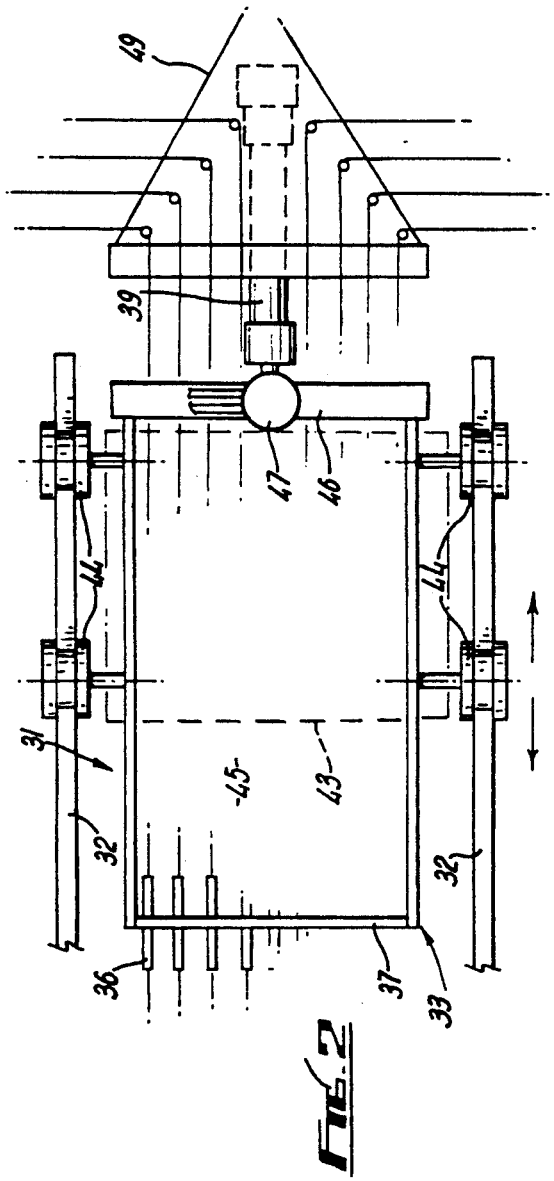
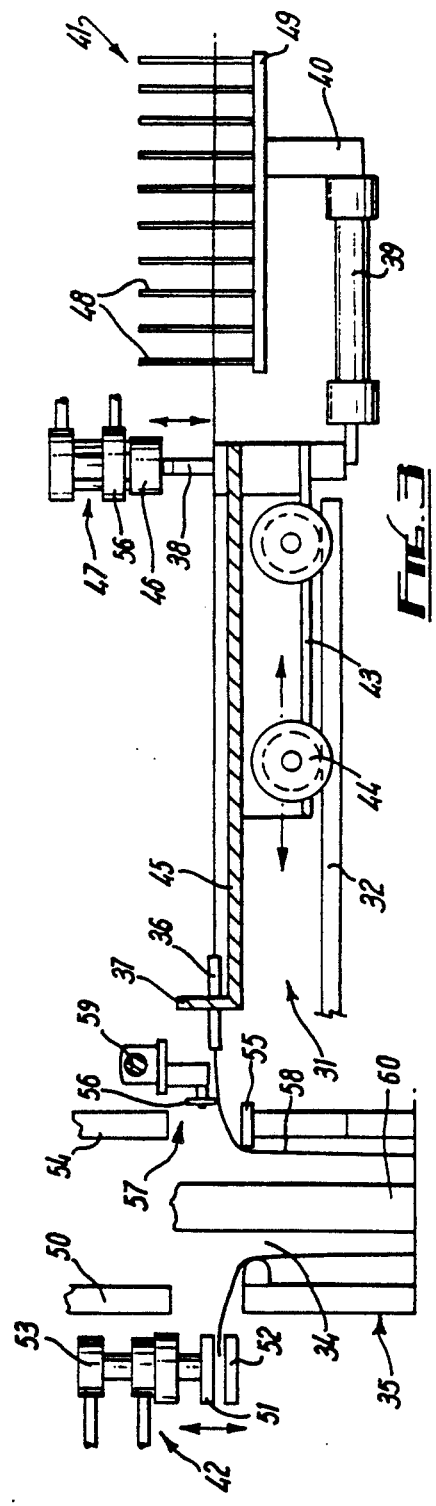

APPARATUS AND METHOD FOR INTRODUCING REINFORCEMENT INTO A MOLD

FIELD OF THE INVENTION

The invention concerns the reinforcement of moulded construction products, and has more particular reference to the introduction of reinforcing material in the form of strands into a mold intended to receive a fluent, moldable material.

The invention is particularly, though not exclusively, concerned with the inclusion of elongate reinforcing materials in partition panels comprising liquid setting particulate materials such as gypsum.

BACKGROUND OF THE INVENTION

In our prior British Pat. Nos. 1346767, 2045150 and 2067125, and in GB-A-2183200, we disclose methods for the production of such construction products as partition panels, roof decking and pipes from liquid setting particulate material, the methods involving the feeding of dry powders or powder/fiber mixes at a controlled rate into molds containing vertical core formers and the compacting of such powders or powder/fiber mixes by vibration or by a combination of vibration and pressure.

The requirement may exist for the reinforcement of the construction product throughout its vertical extent (in the mold) by a continuous elongate material, for example a glass fiber strand.

The introduction of the strand, or a plurality thereof, in spaced side-by-side disposition, throughout the considerable vertical extent of a mold for producing storey height partition panels gives rise to difficulty, particularly in view of the need to locate the individual reinforcing elements relative to the surface of the end product to very close tolerances and do this reliably under automated production conditions.

SUMMARY OF THE INVENTION

The object of the present invention is to provide a method of and means for the introduction of reinforcement into a construction product.

According to one aspect of the present invention there is proposed a method for the introduction of one or more reinforcement strands into a vertical mold through an open top thereto, which method comprises the steps of positioning the or each strand to overlie the open top of the mold, engaging each strand by an insertion means, and causing said insertion means to move progressively downwardly into the mold and thus introduce thereinto a requisite length of reinforcing strand.

According to a preferred feature, each strand extends across the open top of the mold and the free end thereof is clamped at that side of the mold remote from the said supply, the strand moving relative to the insertion means on progressive engagement of said insertion means with the mold, thus to draw a length of strand material from a supply thereof.

According to a further preferred feature, a plurality of reinforcement strands is introduced simultaneously into the mold, said strands being provided in spaced side-by-side disposition and being engaged by a common insertion means.

According to another aspect of the invention, there is proposed apparatus for introducing one or more reinforcing strands into a vertical mold comprising a carriage movable between first and second positions relative to the open top of the mold and respectively corresponding to advanced and retracted positions of the carriage, a first selectively operable strand clamping means on the said carriage to receive a reinforcing strand or strands into engagement therewith, a second selectively operable strand clamping means at that side of the said open top remote from the said carriage likewise to receive the reinforcing strand or strands, said first and second clamping means being actuable to clamp strands engaged therewith, and insertion means in alignment with the open top of the mold, the said insertion means being reciprocable in the plane of the mold and being adapted upon such reciprocation to engage each said reinforcing strand, to draw the same from a supply thereof and to introduce said strand or strands into the mold throughout the whole or substantially the whole of the vertical extent thereof.

According to a preferred example, the insertion means is cooperable with an elongate strip extending transversely of and releasably engageable therewith, the elongate strip being positionable to overlie each said reinforcing strand and the insertion means engaging each strand through said strip.

According to further preferred feature, the elongate strip comprises a card profiled for location relative to the insertion means and to position the or each elongate element relative thereto.

BRIEF DESCRIPTION OF THE DRAWING

The invention will now be described further, by way of example only, with reference to the accompanying diagrammatic drawings illustrating two embodiments thereof and in which:

FIGS. 1A to 1E show, in diagrammatic manner, the successive stages in the introduction of reinforcing strands into a mold, in accordance with the method of the invention;

FIG. 2 is a plan view of a typical form of apparatus constructed in accordance with the invention;

FIG. 3 is a side elevation of the apparatus shown in FIG. 2;

DETAILED DESCRIPTION OF THE INVENTION

Figure 4:
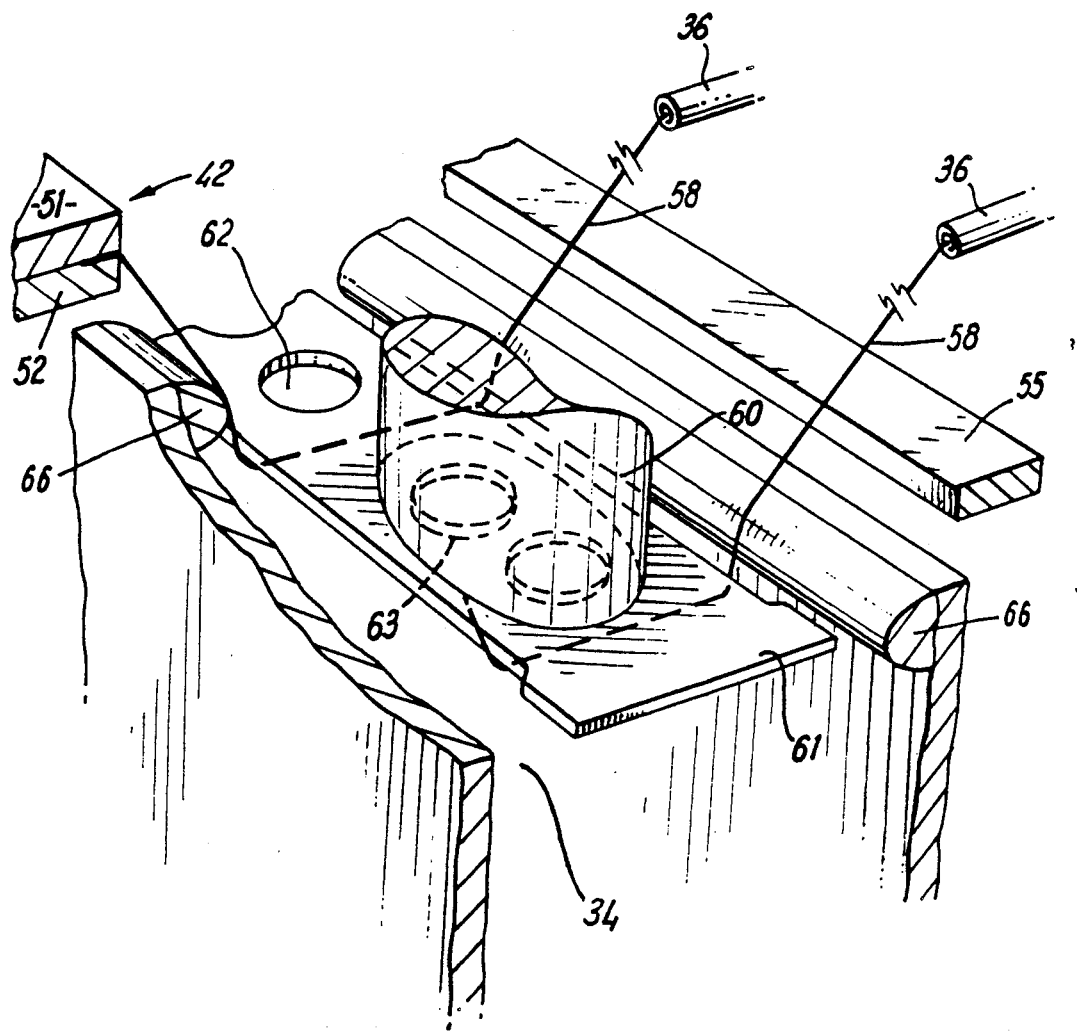
FIG. 4 is a scrap perspective view of an insertion means engaged with a disposable strip overlying a plurality of reinforcing strands and shown at an intermediate stage in the introduction of such strands into a vertical mold.
Figure 5:
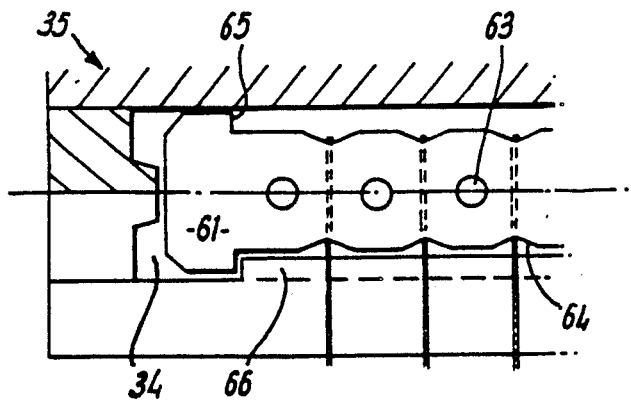
FIG. 5 is a diagrammatic plan view, partly in section, and shows the relationship between the disposable strip and the mold cross-section.

Referring now to the drawings, and particularly to FIGS. 1A to 1E thereof, a method for the introduction of reinforcing material into a vertical mold 2 in the manufacture of a reinforced construction product includes the steps of providing a multiplicity of strands 1 of the reinforcing material arranged in parallel side-by-side disposition across the open top of the mold, engaging each strand 1 by means of a vertically movable insertion means 3 and causing such insertion means 3 to move progressively downwardly into the mold cavity 4 so as to draw said strands from respective continuous supplies 5 thereof and locate the same in spaced disposition relative to and throughout the full vertical extent of the opposing mold surfaces 6, 7.

The strands of reinforcing material are positioned to overlie the open top of the mold by means of a reciprocable carriage 8 supporting side-by-side strand guide tubes 9, one for each strand and of which one only shown, the carriage 8 further providing a selectively operable strand clamp 10 through which the strands 1 pass in moving from the respective continuous supplies 5 to the tubes 9.

A further selectively operable strand clamp 11 is provided at one side of the mold, being that side remote from the said continuous supplies 5, whilst a cutting means 12 is provided at the other side of the mold.

The insertion means 3, which means 3 may, as in the illustration, comprise core formers intended to remain in the mold during the filling thereof or merely pushers which position the strands and are then withdrawn to be replaced by core formers, engage the strands 1 through the medium of a semi-rigid strip 13 which serves, in conjunction with spacer beads 14 on the mold sides, the locate the strands within the mold.

The sequence of operations is illustrated by the successive FIGS. 1A to 1E.

Thus, referring particularly to FIG. 1A, with insertion means 3 in a position remote from the mold, and with clamps 10 and 11 respectively closed and open, carriage 9 is advanced such that the protruding end of strand 1 is positioned for engagement by clamp 11 on the closing thereof. The condition of clamps 10 and 11 is reversed and carriage 9 is then withdrawn to the position shown in FIG. 1B.

On lowering the insertion means 3 into the mold, the semi-rigid strip 13, mounted on lugs at the lower ends of such means, engages the strands and pushes such strands downwardly into the mold cavity, (FIG. 1C), strand material being drawn from the respective supplies 5 through open clamp 10 against the restraint of a tension means 18 between the strand package 5 and carraige 8. Tension in the strand is of importance, and needs to be accurately controlled.

Movement of the insertion means continues until the cross-head 15 (from which the insertion means 3 depend) engages the top of the mold to clamp the strands thereagainst, as is shown in FIG. 1D. It will be observed that the strands are held in spaced apart, taut parallel relationship with respect to the opposing mold faces, being located by the mold beads 14 and the corresponding edges of strip 13, and being in taut condition by virtue of the tension introduced by the tension means aforesaid and the clamping effect of the cross-head 15 on the top of the mold 2.

FIG. 1E illustrates the filling of the mold, the insertion means 3 remaining in position during such filling and providing a means of effecting powder compaction after vibration, in accordance with the teaching of our GB-A-2183200.

Since the semi-rigid strip 13 is not normally a sufficiently close fit to prevent leakage of powder during filling, in view of the vibration to which the mold is subjected during the filling operation, it is convenient to provide a rubber pad between the mold base and vibrator table, the pad 16 and table 17 being identified in FIG. 1E. Once the powder is compacted, it will not leak round the strip when the mold is lifted from the vibrator table.

The reinforcing strands may, for example, be of metal, plastic or glass-fiber, and a typical tensile reinforcement for a gypsum wall panel would be a glass fiber roving of 600 tex. Whilst the spacing between adjacent strands will vary according to specific circumstances, in the wall panel aforesaid a typical spacing would be 15 mm.

Apparatus for use in introducing reinforcing strands into a vertical mold in the manufacture of a partition panel from moldable dry powders or powder/fibre mixes in accordance with the method of the invention is shown in FIGS. 2 to 5 and comprises a wheeled carriage 31 movable on guides 32 between a retracted position as shown and an advanced position wherein the forward end 33 of the carriage overlies the open upper end 34 of a vertical mold 35, a multiplicity of spaced parallel strand tubes 36 arranged in horizontal disposition in an upstanding flange 37 of said carriage, a strand clamp 38 extending transversely of the carriage 31 at the rearward end thereof, and displacement means 39 operably connected between the wheeled carriage 31 and a fixed lug 40 provided at the underside of a strand creel 41. Guide tubes 36 will have smooth rounded edges, and be of a sufficient length and close diameter to support the free end of the strands without excessive lateral slewing or dropping. As an alternative to guide tubes, as such, grooves, plates or bars may be found to be preferable.

The apparatus further includes a second strand clamp 42 adjacent the open end of the mold and positioned at that side of the mold remote from the carriage guides 32.

Carriage 31 consists of a generally square chassis 43 having wheels 44 secured thereto, the chassis supporting a plate 45 which extends forwardly of the chassis and presents flange 37 at its forward end, the clamp 38 being adjacent and above the rear edge of the plate and extending throughout substantially the full lateral extent thereof. Yarn clamp 38 is provided at the underside of a rigid bar 46 secured in spaced parallel disposition relative to plate 45 and its position is controlled by a pneumatic piston and cylinder arrangement 47 mounted on the said bar 46.

Displacement means 39 likewise comprises a pneumatic piston and cylinder arrangement.

Creel 41 includes a multiplicity of spindles (not shown) each to secure a respective strand package and a corresponding multiplicity of guide rods 48 mounted in spaced disposition on and upstanding from a triangular base 49, the spacing of the rods 48 when viewed from the front of the carriage, corresponding to the spacing of the yarn tubes 36 in flange 37.

The second strand clamp 42 is positioned in generally horizontal alignment with the array of tubes 36 and is attached to a fixed guide rail 50 on which the mold 35 is movably mounted for transportation purposes, the clamp comprising an elongate clamping plate 51 arranged in opposed disposition relative to a fixed clamp plate 52 sensibly coextensive therewith, clamping plate 51 being movable towards or away from fixed plate 52 by pneumatic piston and cylinder means 53.

A second guide rail 54 is provided in spaced parallel disposition relative to guide rail 50, such rail 54 likewise supporting the mold 35 during transport thereof, there being an elongate platen 55 arranged below and in spaced parallel relationship to guide rail 54.

The blade 56 of a rotary knife assembly 57 cooperates with the platen 55 in severing strands 58 which overlie said platen, said assembly 57 being movably mounted on a fixed bar 59 extending parallel to guide rail 54 and being shiftable axially of bar 59 by pneumatic piston and cylinder means (not shown). Other cutter assemblies, for example, a guillotine may be used.

The apparatus further includes an insertion means engageable with a sheet of strands 58 extending across the open upper end 34 of the mold 35 between tubes 36 and clamp 42, said insertion means being reciprocable relative to the mold through the full vertical extent thereof. In the arrangement illustrated in FIG. 4 the insertion means comprises a plurality of rigid elongate elements 60 vertically arranged in spaced side-by-side disposition, said elements 60 depending from support means, not shown, whereby they can be lowered into position within the mold 35. In the context of the manufacture of a cored partition panel, the rigid elongate elements 60 may comprise the inflatable core formers present in the mold during the filling of the same with a powder/fibre mix and the subsequent compaction thereof.

The insertion means engage the sheet of yarns 58 through the medium of a rigid or semi-rigid strip 61 located at the underside of the rigid elongate elements, across the underside of which the strands move on progressive lowering of the insertion means, the strip 61 being of a length and width to conform to the corresponding plan dimensions of the mold cavity and being profiled, as at 62, to receive pins 63 at the lower extremities of the elongate elements into coperable engagement therewith. The edges of the semi-rigid strip may also include recesses 64 to receive the respective strands and accurately to locate such strands in the longitudinal direction of the strip as the strands move relative to the strip on progressive downward movement of the strip Strip 61 will ordinarily be of cardboard, and will become part of the finished partition panel, although "cards" of plastic or metal may be used if preferred. In these latter circumstances the re-usable strips will, if necessary, be profiled, radiussed or the like, to avoid damage to the strand on movement thereacross, and will be retrievable by trimming off the end of the panel.

By suitable dimensioning of the "card", the extent to which the strand is spaced from the mold surface may be varied to suit particular requirements, a typical spacing being, say, 2 mm.

In addition to its function in providing an intermediary between the insertion means and individual strands, the "card" serves to locate the lower ends of the core formers accurately within the mold and also effectively "closes" the bottom of the mold thus holding the powder in place during mold transfer and post-filling processes. The continued presence of the "card" in the finished product provides a strengthening membrane at the base thereof.

As an alternative to locating the cards against the opposing mold faces, with appropriate cut-outs 65 to accommodate the spacer beads 66 provided at the top of the mold, said cards may be profiled to cooperate with the tongue and groove formations at the mold ends.

The sequence of operations necessary to introduce reinforcing strands into a mold cavity is analogous to that identified by reference to FIGS. 1A to 1D, and further description is not thought necessary. It is to be understood that if the cross-head from which the insertion means/core formers depend does not engage the top of the mold sides to clamp the strands thereagainst some alternative clamping means will be provided to maintain the strands in taut condition.

Figure 6:
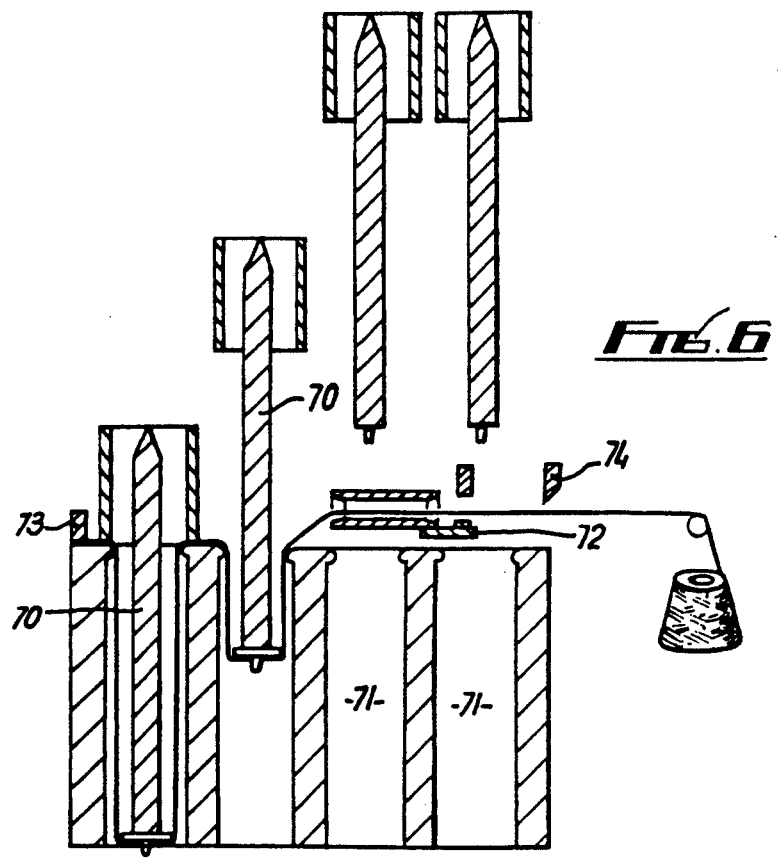
FIG. 6 is a diagrammatic view, generally along the lines of FIG. 1, and shows the application of the method of the invention to a multiple-cell mold.

The method of the invention is illustrated in FIGS. 1A to 1E hereof in the context of a single cell, but it is equally of application in the context of a multiple-cell mold, such an arrangement being shown diagrammatically in FIG. 6 of the drawings.

As is apparent from the drawing, the core former 70 of each of the successive mold cavities 71 is lowered upon completion of the movement of the previous core former and the carrier 72 is withdrawn in step-wise manner across the multiple mold openings. As indicated, a clamp 73 and a cutting means 74 analogous to clamp 11 and cutting means 12 of FIGS. 1A are provided at the end cells respectively of the multicell mold.

The invention is not limited to the detail of the arrangements herein set forth, since alternatives will readily present themselves to one skilled in the art.

Thus, for example, whilst the invention is disclosed in the context of construction products molded from dry powders or powder/fiber mixes, the method and apparatus are throught likely to be of application in other contexts where reinforcement is required.

Furthermore, although the embodiment hereindisclosed serves to introduce a U-shaped yarn run, an analogous arrangement may be used for the introduction of a single run of yarn.

It is to be understood that, notwithstanding that the arrangement illustrated in FIGS. 2 to 5 shows otherwise, strand clamp 42 and cutting means 57 may operate against bearing surfaces, typically of rubber, provided on the top edges of the mold sides, in like manner to the arrangement shown in FIG. 1.

What is claimed is:

1. A method of forming a hollow-cored product comprising
    (a) advancing at least one reinforcing strand material across an open top of a vertical mold by means of a reciprocating carriage having at least one strand supply means;
    (b) clamping said strand at a side of said mold by a first clamping means;
    (c) retracting said carriage to a position retracted from said mold on a side opposite said first clamping means whereby said strand extends across the opening of said mold;
    (d) axially extending an insertion means on the strand and into said mold, said insertion means including an elongated strip removably attached at one end of said insertion means thereby drawing said strand axially into said mold from said supply means and spacing said strands from a side wall of said mold;
    (e) clamping said strand at a side of said mold by a second clamping means opposite said first clamping means and tensioning said strand;
    (f) introducing a moldable material into said mold and forming a molded product;
    (g) removing said insertion means from said mold; and
    (h) removing said product from said mold.

2. Apparatus for the manufacture of hollow-cored construction products comprising a vertical mold having an open top and internal surfaces and means for introducing at least one reinforcing strand into said mold, said means comprising:
    (a) a carriage reciprocable with respect to the open top of the mold between first and second positions respectively corresponding to advanced and retracted positions of the carriage, said carriage including means to supply at least one reinforcing strand across said open top of said mold;

(b) a first selectively operable strand clamping means on the carriage to receive and clamp said strand into engagement therewith;

(c) a second selectively operable strand clamping means at a side of the open top opposite from the retracted position of the carriage to receive and clamp said strand from the carriage when said carriage in the advanced position, the first and second clamping means being actuable to clamp said strand engaged therewith;

(d) an elongated strip for location in the mold through the open top thereof in essentially parallel relation to said top; and (e) insertion means positioned for axial reciprocable motion into and out of the mold to releasably engage said elongated strip and move said strip progressively into the mold whereby the strip engages said reinforcing strand to draw the strand from a supply thereof and to introduce the strand into the mold substantially throughout the vertical extent thereof on said progressive movement.

3. Apparatus as claimed in claim 2, wherein the insertion means comprises an elongated core former positionable in said mold.

4. Apparatus as claimed in claim 2 wherein said elongated strip is profiled to locate said strand within said mold.

5. Apparatus as claimed in claim 2 wherein the elongated strip is dimensioned to engage opposing surfaces of the mold, thereby to locate the strip in said mold.

6. Apparatus as claimed in claim 2, wherein said elongate strip is shaped to conform to the corresponding plan dimensions of the mold cavity.

7. Apparatus as claimed in claim 3, wherein the core former means includes axially extending pins at a remote end thereof and the elongate strip includes apertures each to receive a respective pin into closely fitting engagement therewith.

8. Apparatus as claimed in claim 2, wherein the second selectively operable clamping means is mounted on the mold.

9. Apparatus as claimed in claim 3, wherein the core former means includes multiple side by side elements mounted in a common cross-head.

10. Apparatus as claimed in claim 9 wherein the cross-head is engageable with the top of the mold to clamp the said at least one reinforcing strand there against.

11. Apparatus as claimed in claim 2, further including inwardly facing spacer heads at respective longitudinal edges of the mold and substantially in the plane of the open top thereof.

12. Apparatus as claimed in claim 2, wherein the mold includes a plurality of mold cavities arranged in spaced parallel back-to-back disposition, and a plurality of complementary insertion means and elongated strips for each mold cavity, the insertion means for each respective mold cavity including multiple side-by-side core former elements mounted on a common cross-head engageable with the top of the mold to clamp said reinforcing strand thereabout, the insertion means of the respective cavities being adapted to be positionable thereon in sequence.

13. Apparatus as in claim 2 wherein said elongated strip is dimensioned to space said reinforcing strand from a vertical wall of said mold.

14. Apparatus as in claim 2 wherein said carriage includes means to supply a plurality of reinforcing strands to said mold.

15. Apparatus as in claim 14 wherein said elongated strip includes means to space said plurality of strands in said mold.

16. Apparatus as in claim 2 comprising means to introduce a molding material into said mold.

17. Apparatus as in claim 2 comprising means to move said carriage to said first position to supply said strand across the top of said mold and to said second clamping means and means to retract said carriage to the retracted position and draw said strand from said second clamping means across said opening of the mold.

* * * * *